April 6, 1965 A. HAMBURGEN 3,177,352

DATA REDUCTION SYSTEMS

Filed Dec. 24, 1959 4 Sheets-Sheet 1

INVENTOR
ARTHUR HAMBURGEN
BY P. M. Brannen
AGENT

April 6, 1965 A. HAMBURGEN 3,177,352

DATA REDUCTION SYSTEMS

Filed Dec. 24, 1959 4 Sheets-Sheet 2

April 6, 1965 A. HAMBURGEN 3,177,352

DATA REDUCTION SYSTEMS

Filed Dec. 24, 1959 4 Sheets-Sheet 3

United States Patent Office 3,177,352

Patented Apr. 6, 1965

3,177,352
DATA REDUCTION SYSTEMS

Arthur Hamburgen, Endicott, N.Y., assignor to International Business Machines Corporation, New York, N.Y., a corporation of New York Filed Dec. 24, 1959, Ser. No. 862,003
5 Claims. (Cl. 235—183)

This invention relates to data reduction systems for use in conjunction with pattern scanning systems, and particularly to improved data reduction systems for reducing scanning data obtained by scanning patterns to be recognized, to obtain a reduced amount of data for subsequent analysis.

It has previously been proposed to provide pattern recognition circuits in which the patterns to be recognized are scanned by means of a very small scanning spot. The use of a very small scanning spot is advantageous for supplying adequate scanning signals when scanning lines of weak pattern, apparently because such lines, when considered microscopically, actually consist of dark ink portions deposited in small scattered areas, and thus a very fine scanning spot will cover such areas only, while a larger spot will also cover the lighter areas between the small dark areas, so that the signal is diluted.

However, the use of a small scanning spot is not without attendant difficulties. The major disadvantage is that the amount of data which must be processed is greatly increased, if it is assumed that the scanning signals are analyzed directly. Also, if the data is analyzed in its raw or unreduced form, it could be misleading for certain patterns in that it could indicate a light area in portions of a pattern which should be considered as a dark area, so that marginal patterns would provide ambiguous outputs.

Previously, it has been proposed to reduce data obtained by fine spot scanning by determining whether or not, within a specified time interval, there was or was not a predetermined number of scanning signals supplied as a result of scanning a dark area. In other words, the data obtained over a predetermined time interval as the spot scanned a predetermined number of incremental areas must have indicated the fact that portions of a character were sensed for a predetermined percentage of the time interval before a decision was made that the entire area scanned during this period is to be considered as a black area.

The present invention is an improvement over the arrangements previously proposed in that it integrates, overlapping time intervals, the raw scanning information for determining when a particular scanning area is to be considered all black or all white. The integrations are carried out in such manner that the relative sampling times at which data is obtained is unimportant for determining whether or not the interval shall be considered as "black" or "white."

Briefly described, the present invention is directed to a data reduction system in which the raw data is first integrated at a first submultiple of the time rate of presentation, successive integration intervals being displaced by a single unit of the presentation rate, and is thereafter again integrated at a second submultiple of the rate of presentation, whereby the effects of time of presentation of data to the first integrating means are eliminated by the second integration.

More particularly, the present invention contemplates at least two successive integrations of raw data, at different rates, and which integrations may be carried out in either analog or digital form. The results of the second integration are selected from a high or a low range of values in accordance with the ultimate value of the next preceding integration.

By appropriate selection of integration intervals or limits, such reduction can be carried out for two coordinate scanning data, by employing two sets of plural integrators, one for each coordinate and connecting them in tandem.

Accordingly, a principal object of this invention is to provide a data reduction system in which data is integrated more than once, at different intervals, to provide reduced data.

Another object of the invention is to provide a data reduction system in which data, digitalized both in time and amplitude, is integrated twice to provide a reduced data output.

A further object of the invention is to provide a data reduction system in which raw data, analog in time and amplitude, is integrated twice to provide a reduced data output.

Still another object of the invention is to provide a data reduction system in which raw data, either analog or digital in amplitude, and either analog or digital in time, is integrated twice to provide a reduced data output.

A further object of this invention is to provide a data reduction system for a scanning-type character recognition system in which the scanning data is reduced in one scanning coordinate.

Yet another object of the invention is to provide a data reduction system for a scanning-type character recognition system in which the scanning data is reduced in two coordinates.

Another object of this invention is to provide a method of data reduction in which this raw or unreduced data is integrated twice, over overlapping time intervals for the first integration and preferably nonoverlapping time intervals for the second integration and selected by different threshold values in accordance with previously reduced data to provide reduced data.

The foregoing and other objects, features and advantages of the invention will be apparent from the following more particular description of preferred embodiments of the invention, as illustrated in the accompanying drawings.

In the drawings.

Similar reference characters refer to similar parts in each of the several figures of the drawings.

Figure 1:
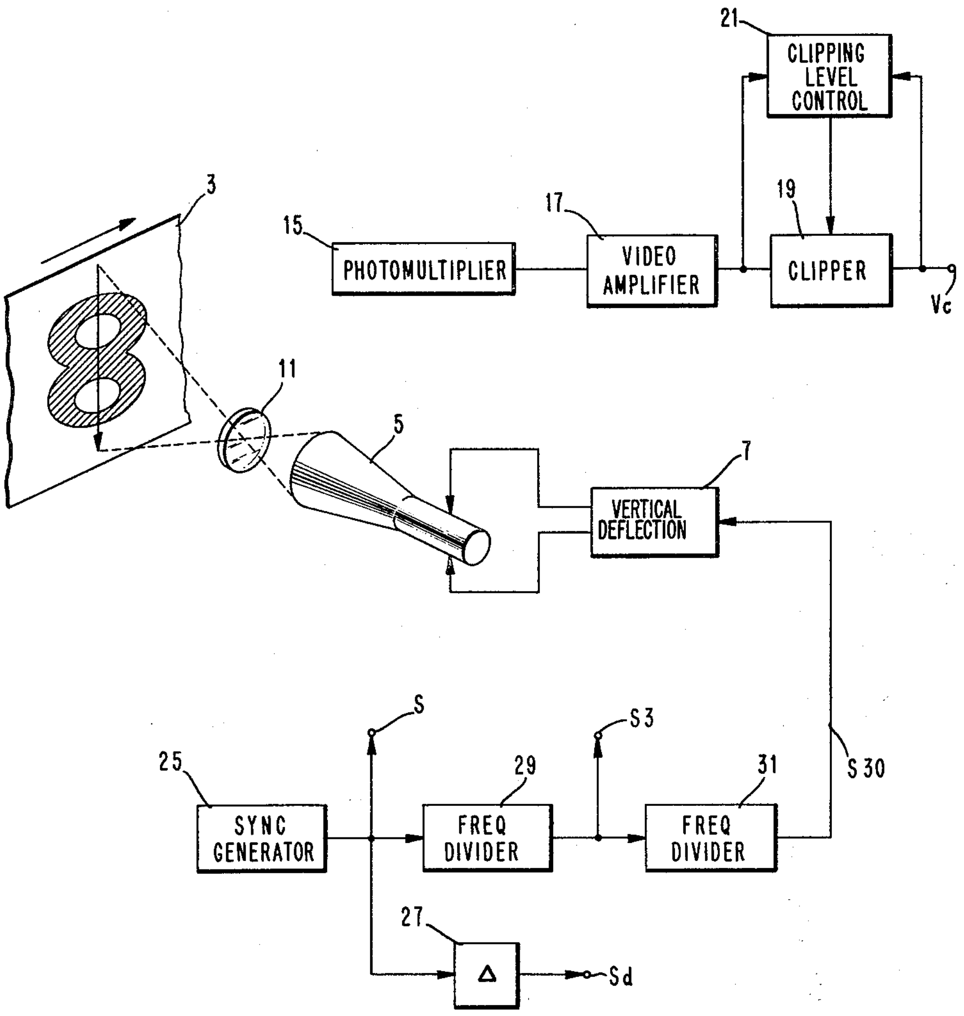
FIG. 1 is a schematic illustration of one form of scanning apparatus which may be employed in conjunction with the present invention.

Referring now to FIG. 1, there is shown an arrangement employing a flying spot scanner for scanning characters on a record medium for analysis and recognition. A document 3, having thereon characters to be analyzed, such as the character "8" shown thereon, is moved, by document transport means not shown, past an analyzing or scanning station in the direction shown by the arrow. At the scanning station, suitable means is provided for scanning the document and the characters thereon. For the purposes of this disclosure, a flying spot scanner is shown, comprising a cathode ray tube 5, with suitable vertical deflection circuits 7 arranged in well-known manner so that for each controlling or scan starting pulse supplied to the deflection circuits 7, the spot of the cathode ray tube sweeps through a single vertical trace, which is projected via a suitable optical system designated symbolically by line 11 onto the document 3. The record is advanced at such a rate that a plurality of successive and adjacent vertical scans are made through each character.

The variations in light reflected from the document as a result of the scanning operation are transduced by suitable means, such as a photomultiplier 15 or other device which is effective to change the variations in reflected light to electrical signals to provide trains of scanning or video signals which vary in accordance with the intensity of the scanned character or document background.

It should be noted that other forms of scanning known in the art may be employed to provide signals of the same nature. For example, the document may be steadily illuminated and a mechanical scanner interposed between the photomultiplier and the document to provide a similar type of scanning.

The video signals from the photomultiplier 15 are supplied to a video amplifier 17, which is of conventional design and serves to amplify the signals to adequate levels for further use. The video signals are clipped by a clipper 19 which is governed by a clipping level control 21, the details of which form no part of the invention, but which are designed to clip the signals to predetermined values. These clipped signals, which are of constant amplitude, are then supplied to a terminal V*c*, for subsequent processing by the data reduction apparatus to be subsequently described.

Figure 4:
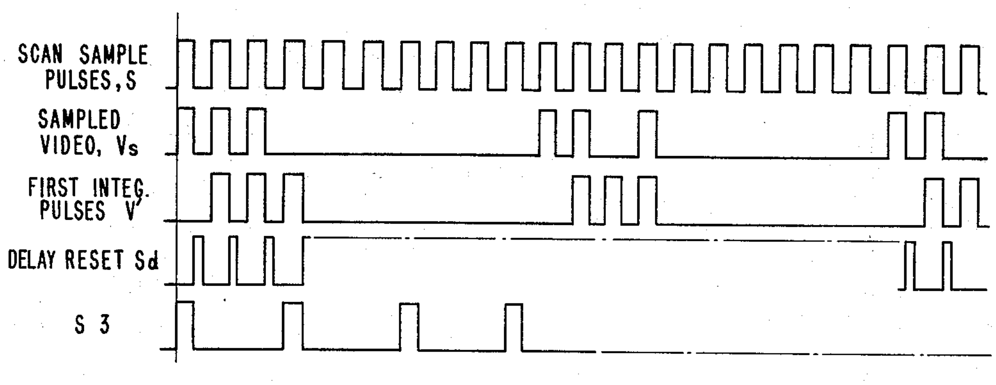
FIG. 4 is a schematic illustration of idealized waveforms which occur at different points in the circuitry of FIG. 2, during the scan illustrated in FIG. 3.

FIG. 1 also shows the necessary apparatus and connections for supplying timing or synchronizing pulses for the remainder of the system. A sync generator 25, which may be for example a free-running multivibrator or other source of pulses, supplies a continuous train of pulses at a predetermined rate. These sync pulses are supplied to a terminal S, for use elsewhere in the system, and are also supplied through a suitable delay device 27, such as a single-shot multivibrator, to a terminal S*d*. These delayed sync pulses are timed so that they occur at the termination of the original sync pulses, and terminate within the intervals between the original sync pulses, as shown in FIG. 4. The original sync pulses from sync generator 25 are also supplied through two frequency dividers 29 and 31, connected in tandem. The output of frequency divider 29, in addition to being connected to the input of frequency divider 31, is connected to a terminal S3. The frequency of the pulses at terminal S3 are at some submultiple of the original sync frequency, for example 1/3 of the original frequency. These pulses are further divided by frequency divider 31 to another submultiple value which may be for example 1/10, so that the output of frequency divider 31, on the line designated S30, will be at a relatively high submultiple of the original frequency, in the present example, 1/30th of the original frequency. These pulses are supplied to the deflection generator 7 and are used to trigger the start of each vertical scan.

It can be seen from the foregoing that during each vertical scan, a predetermined number of pulses will be supplied to terminal S and a like number, slightly delayed, will be supplied to terminal S*d*. In the present instance, there would be 30 S and S*d* pulses during each scan. Moreover, a smaller number of pulses, regularly spaced throughout the scan at some submultiple of the original sync frequency will be supplied to terminal S3 during each scan.

Figure 2:
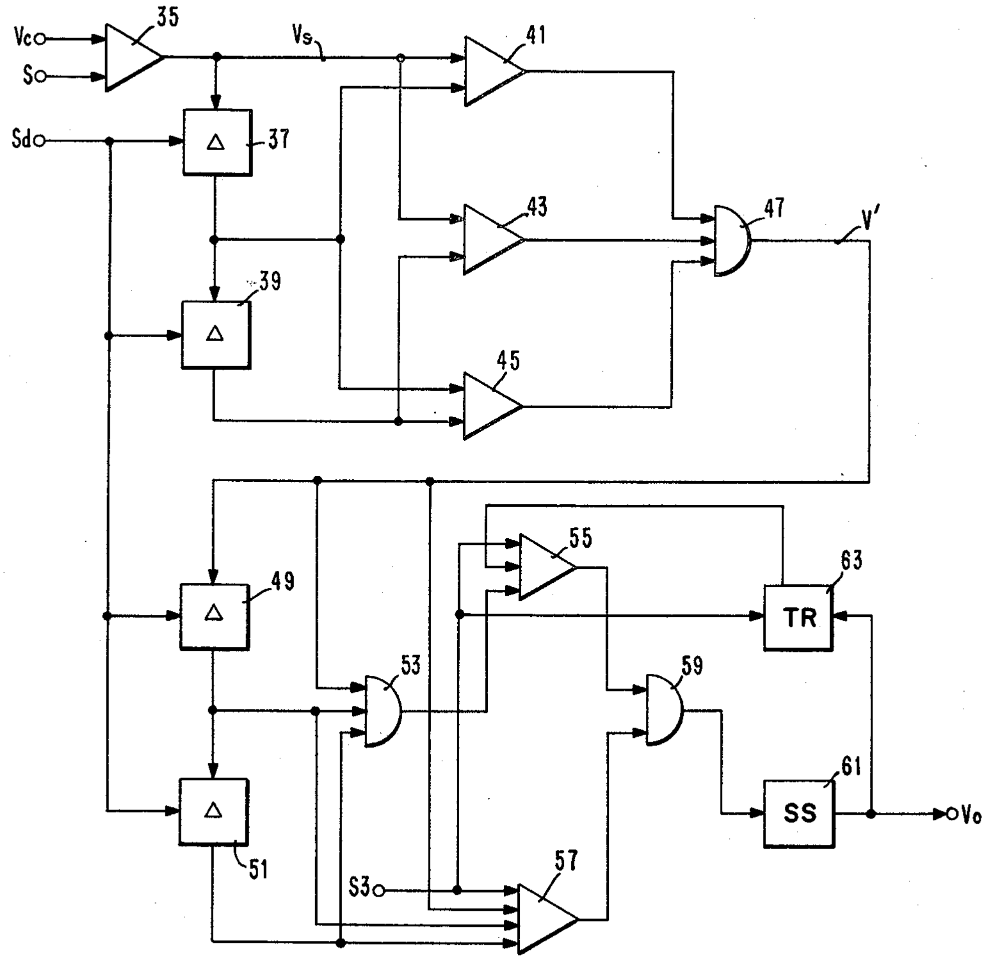
FIG. 2 is a schematic illustration of a preferred embodiment of logical circuits for carrying out the present invention.

Referring now to FIG. 2, there is shown a preferred embodiment of the invention for performing a double inegration of sampled video signals in order to perform data reduction in a single coordinate.

The clipped video signals are supplied via terminal V*c* to one input of an AND circuit 35, the other input of which is connected to terminal S. The output line of this AND circuit, designated as V*s*, will accordingly carry the clipped video signals, sampled at a plurality of intervals during each scan.

The sampled video signals are supplied via line V*s* to a first integrating circuit comprising a first and a second delay device 37, 39 connected in tandem, three AND circuits 41, 43, 45, and an OR circuit 47. The delay units are proportioned and arranged so that a pulse supplied to the input thereof, will be supplied from the output delayed by a time interval equal to that between each of the sync pulses S.

The delay units are supplied with readout or reset pulses from the terminal S*d*, so that following each time interval in which signals may be received by the delay units, the contents thereof may be shifted out, or the delay reset, as the case may be, by the delayed sync pulses. The AND circuits 41, 43 and 45 and the OR circuit 47 connected to the outputs of these AND circuits function in such manner that an output is present on the line designated V′ when and only when a sampled video pulse has existed during any 2-out-of-3 or 3-out-of-3 successive sampling intervals. A single sampled video pulse alone during any three successive intervals will not produce an output. Adjacent sampled video signals scanning during either the beginning or the ending of any one group of sample times will cause inputs to be supplied to the AND circuits 45, or 41, as the case may be. A sampled video pulse, followed by no pulse followed by another pulse will cause inputs to be supplied to AND circuit 43. Under any condition, therefore, when sampled video is present for 2 or 3-out-of-3 sample times, OR circuit 47 will provide an output.

The result of this first operation, which might be termed a digitalized integration over overlapping time intervals of the sampled video signals, is to provide an output signal on the line V″ in accordance with a first rule, i.e., integrate over a distance of a single scan equal to the time interval required for three sample pulses, to thereby integrate the "black" bits, if present, termed $V_{n-1}$, $V_n$, $V_{n+1}$. If at least two "black" bits are present, supply an output signal V′. The first integration interval is displaced by one bit only, so that the succeeding integral is for the period $V_n$, $V_{n+1}$, $V_{n+2}$, and repeat.

The V′ output signals are supplied to a second digital form of integrating circuit, comprising delay units 49 and 51 connected in tandem, an OR circuit 53, AND circuits 55 and 57, and OR circuit 59. As further adjuncts, a single-shot multivibrator 61 provides a suitably delayed output pulse to the output terminal V*o* when the second integration conditions are met, and a trigger 63 is used to provide a "memory" function to be later described. The delay units receive the delayed sync pulses from terminal S*d*, as do delay units 37 and 39, for purposes of shifting out or resetting as the case may be.

It can be seen from the drawing that OR circuit 53 will provide an output therefrom, if in an interval equal to three cycles of the sync generator, 1 or more "black" bits are supplied over line V′, since one input to OR circuit 53 is connected to line V′, a second input is connected to the line connecting the output of delay unit 49 to the input of delay unit 51, and a third input is connected to the output of delay unit 51. The output of OR circuit 53 is supplied to one input of AND circuit 55, another input of which is connected to terminal S3 to receive the submultiple pulses, that is the pulses occurring at one-third the frequency of the scan pulses. A third input to AND circuit 55 is connected to trigger 63 in such manner that this input is energized if the last previous output at terminal V*o* was "white," that is, if no output pulse was supplied to terminal V*o* at output time. The output of AND circuit 55 is connected to one input of OR circuit 59.

AND circuit 57 supplies the other input to OR circuit 59. The inputs to AND circuit 57, in addition to the input from terminal S3, are the same as the inputs to OR circuit 53. Since, however, the AND circuit requires concurrent presence of all inputs to provide an output, such an output will exist at sampling time only if all of the bits in a successive group of three are black, i.e., three successive signals on the V′ line during the present and the two preceding sync time intervals.

The output from OR circuit 59 is supplied to the input of single-shot multivibrator 61 which increases the duration of pulses supplied in such a way that the trailing edge of its output occurs after the trailing of one S3 pulse, but before the trailing edge of the next S3 pulse, the exact timing being determined by the resolution of trigger 63. The output of single-shot multivibrator 61 is supplied to terminal V*o*, and which output represents the reduced data, which is then supplied to a subsequent recognition system. Such a recognition system may take any number of well-known forms, and since the exact form is immaterial to the present invention, it is deemed unnecessary to show or describe such a system.

The output signals at terminal V*o* are also supplied to one side of a conventional bi-stable trigger 63. Assuming for the sake of illustration that the trigger is of the type which is switched by the negative-going or trailing edge of a pulse, the trailing edge of an output pulse will set the trigger ON, so that the output from the left-hand side of the trigger, supplied to AND circuit 55, falls to its OFF value. The termination of a slow rate sampling pulse from terminal S3 resets the trigger to its OFF state thereby raising the output from the left-hand side to its ON value. Accordingly, at the start and during each sampling time governed by the S3 pulses, the output of trigger 63 connected to AND circuit 55 will be up, if, during the previous sample time, no signal was supplied to terminal V*o*, i.e., the previous output signal at terminal V*o* was "white."

The second portion of the apparatus therefor provides for a second integration of the signals supplied from the first integrator, with one or the other of two thresholds being applied, depending upon the next preceding output signal V*o*. That is, considering three signal intervals on the V′ line, $V'_{n-1}$, $V'_n$ and $V'_{n+1}$, (*a*) if the next preceding output was "black" then for the present output to be black, $V'_{n-1}$, $V'_n$ and $V'_{n+1}$ must all be black, or (*b*) if the next preceding output was "white," then for the present output to be "black," any one or more of $V'_{n-1}$, $V'_n$ or $V'_{n+1}$ must be black.

Figure 3:
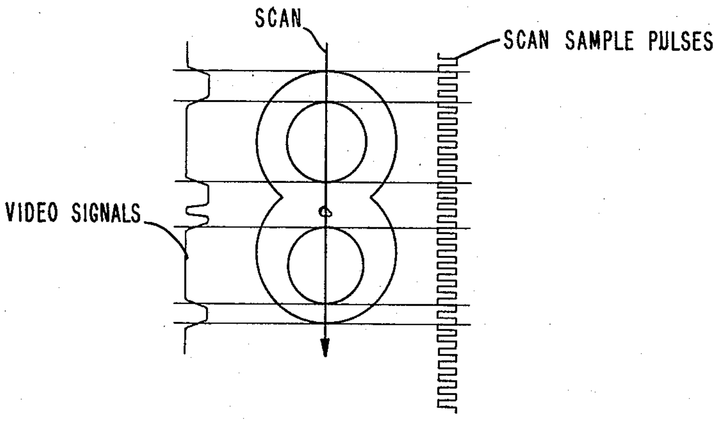
FIG. 3 is a schematic illustration of a character illustrating events occurring during a scan through the character.

FIGS. 3 and 4 illustrate the relations between events occurring during a single scan through a character. In FIG. 3, the single scan through the character "8" produces video signals as shown at the left-hand side of the figure, the void at the center of the "8" producing a temporary dip in the video signal as shown. The scan sample pulses S, shown at the right-hand side of the figure, digitalize the scanning information in time, and the clipping circuits previously mentioned digitalize the scanning information in amplitude.

In FIG. 4, the sampled video signals V*s*, are shown in synchronism with the scan sample pulses S. The output pulses V′ from the first integrator are shown, as well as the reset and sample pulses S*d* and S3.

Figure 5:
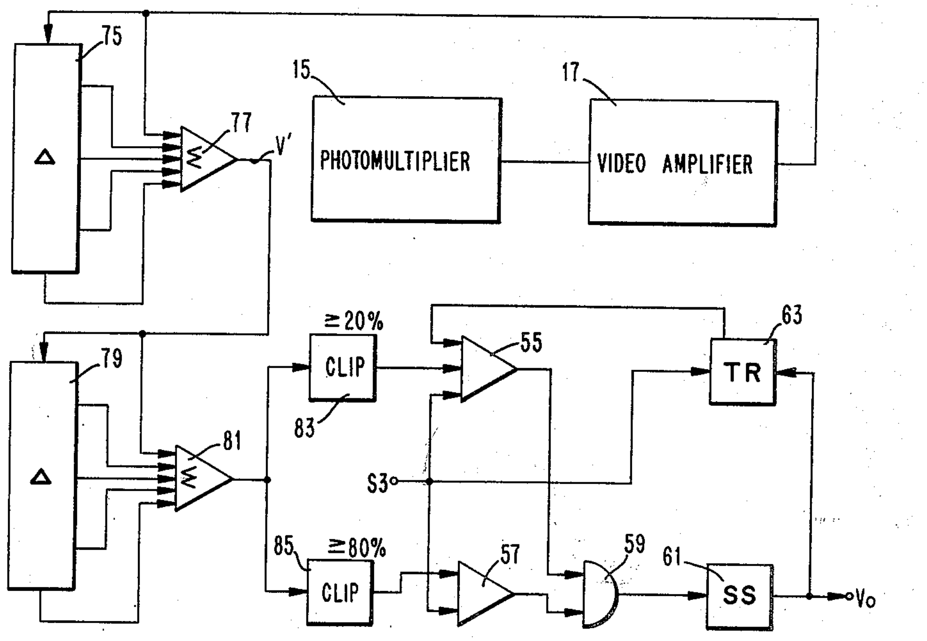
FIG. 5 illustrates another embodiment of the invention in which the successive integrations are analog in nature.

FIG. 5 illustrates another embodiment of the invention in which video signals which are analog in both amplitude and time are integrated twice to provide reduced data. The video signals are supplied, without clipping or sampling, from photomultiplier 15 and video amplifier 17 directly to the input of a delay-line type of integrator comprising a conventional tapped delay line 75 of either the distributed or lumped constant type with a summing network comprising a plurality of resistors connected to the delay line, and commoned to an amplifier. This combination is designated generally by the reference character 77. This arrangement functions in a well-known manner to provide a first integrated output signal on line V′, which is then supplied to a second integrator including delay line 79 and summing network and amplifier 81. The signal existing in the delay line is effectively tapped, or sampled at a predetermined number of points along the tapped line. This in effect provides a plurality of voltage amplitude at different points along the varying analog signal as it passes through the delay line. Each of the tapped or sample voltages is then supplied via an associated summing resistor to a common output terminal, so that, effectively the voltages representing a discrete number of sampled values of the analog signal are summed. This summation approximates the integral with respect to time of the analog voltage signal. Integrators of this general type have been employed as filters, as shown in U.S. Patent 2,263,376. The output from the second integrator is supplied to the clipping circuits 83 and 85, each being arranged so that an output signal is supplied therefrom when and only when the input signal thereto exceeds a predetermined value, indicated as equal to or greater than 20% and 80% for clipping circuits 83 and 85, respectively. If it is desired to obtain the output digital in time as well as amplitude, the remainder of the circuitry may be arranged, as shown, in a manner similar to the output circuitry of FIG. 2.

This arrangement functions in a manner similar to that previously described in connection wih FIG. 2. The first and second summing networks are proportioned and arranged so that the outputs therefrom represent the time integral of the video signals which can exist during intervals, which may be for example, equal to the span of three sample pulses and nine sample pulses, respectively, so that the outputs are of the same order as these provided by the digitalized integrators of FIG. 2. Also, as in FIG. 2, the threshold established for the output signal is made dependent upon the next preceding output. The output of the second integrator when equal to or greater than 80% of the maximum obtainable output voltage (greatest amount of "black") will be passed by clipper 85, so that an output is provided from AND circuit 57 for each S3 pulse, which output is supplied to terminal V*o* via OR circuit 59 and single shot 61. If, during the previous sampling interval, no signal is provided at terminal V*o*, then trigger 63 will enable the "low" value clipper 83 to provide an output via AND circuit 55, as long as the value equals or exceeds 20%.

Figure 6:
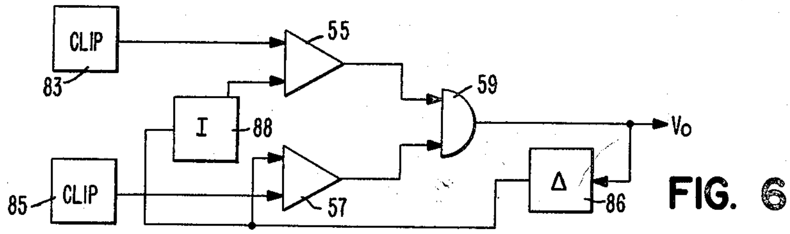
FIG. 6 illustrates a modification of FIG. 5, illustrating an arrangement for providing an output digital in amplitude, analog in time.

In FIG. 6, the output of the clippers through AND circuits 55 and 57 is governed by a delayed V*o* signal, which is returned from V*o* via delay means 86 to one input of AND circuit 57, and through inverter 88 to one input of AND circuit 55. Since the signals are not sampled at discrete intervals, but when present are continuous over a period of time, the output of the arrangement of FIG. 6 is clearly digital in amplitude, analog in time.

Figure 7:
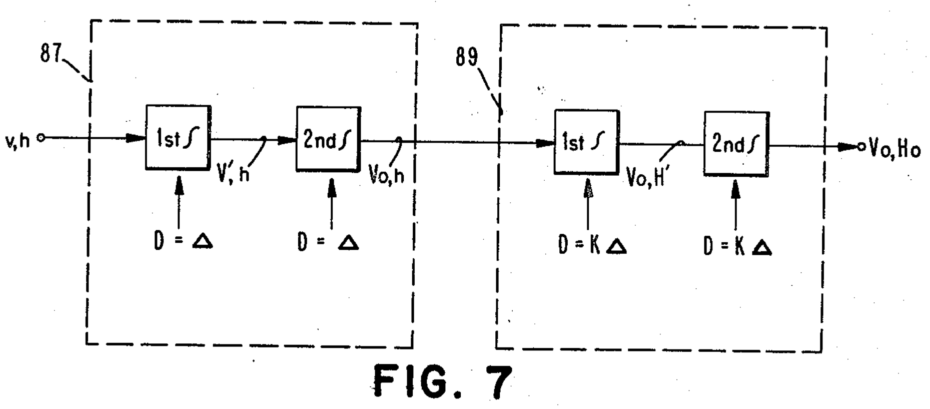
FIG. 7 illustrates the manner in which two sets of plural integrators may be utilized to provide data reduction in two coordinates.

FIG. 7 illustrates, in a simplified block diagram form, how two double integrating arrangements can be connected in tandem to provide data reduction in two coordinates. The first of the two double integrators, as shown in FIGS. 2, or 5, or 6 is arranged to perform the double integration as described above, over time intervals encountered in a single scan. If the coordinates are vertical and horizontal, then the first integrator of the first set integrates the *v*, *h*, bits to provide a V′, *h* output to the second integrator of the first set where the output is then V*o*, *h*. This signal is digital in amplitude, but may be either digital or analog in time. The second set of integrators is arranged as shown in FIG. 2 in the case where the first set is arranged as in FIGS. 2 or 5, or as shown in FIGS. 5 and 6 where the first set is arranged as shown in FIG. 6, to integrate over intervals which are defined by similar times occurring in adjacent scans, so that the time delays or integration limits are selected to represent $n\Delta$, where $n$ is the appropriate multiple representing the number of intervals between similar points on successive scans. Accordingly, the output of the first integrator of the second set is $V_o$, H' and the output of the second integrator of the second set is $V_o$, $H_o$, representing the reduced data in both the vertical and horizontal scanning coordinates.

It will be apparent from the foregoing that the present invention provides an improved form of data reduction, which may be employed for handling data that may be digitalized or analog in time and/or amplitude, by doubly integrating raw data, the first time at overlapping rates, whereby no loss of pertinent information occurs, as can happen when reduction of data must occur within single limits.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Data reduction apparatus for reducing data in the form of input signals comprising first integrating means connected to receive said signals and providing a first integrated output signal proportional to the amplitude-time integral of said input signals during a first predetermined time interval, said first time interval being larger than a first predetermined sampling cycle, said first interval being successively displaced by exactly one sampling cycle, second integrating means connected to said first integrating means to receive said first integrated signals for integrating said signals over a second integrating time interval, said second interval being as long or longer than a second predetermined sampling cycle, said interval being successively displaced by exactly the length of said such cycle, said second sampling cycle being longer than said first sampling cycle, and means connected to said second integrating means for sampling the output of said second integrator by said second sampling cycles.

2. Data reduction apparatus for reducing data in the form of input signals comprising first integrating means connected to receive said signals and providing a first integrated output signal proportional to the amplitude-time integral of said input signals during a first predetermined time interval, second integrating means connected to said first integrating means to receive said first integrated signals and providing a second integrated output signal proportional to the amplitude-time integral of said first integrated output signals during a second time interval, threshold selecting means connected to said second integrating means for selecting predetermined values of said second integrated output signals, and switching means responsive to output signals selected by said threshold selecting means for selecting signals therefrom in accordance with the value of the next preceding signal.

3. Data reduction apparatus for reducing data in the form of analog input signals comprising first integrating means connected to receive said input signals and providing a first analog output signal proportional to the amplitude-time integral of said input signals during a first predetermined time interval, second integrating means connected to said first integrating means to receive said first output signal and providing a second analog output signal proportional to the amplitude-time integral of said first output signals during a second predetermined time interval, an output circuit, threshold selecting means connected to said second integrating means for selecting different values of output signals from said second integrating means, and means for selectively connecting said threshold selecting means to said output circuit in accordance with the value of the next preceding signal supplied to said output circuit.

4. Data reduction apparatus for reducing data in the form of analog input signals, comprising, first integrating means including a first tapped delay line having an input and output and a plurality of intermediate outputs, a first summing network and amplifier connected to said input and output and intermediate outputs of said delay line and effective to provide a first integrated analog output signal approximating the amplitude-time integral of said input signals supplied to the input of said delay line in a first predetermined time interval, second integrating means including a second tapped delay line having an input connected to the output of said first summing network and having an output and a plurality of intermediate outputs, a second summing network and amplifier connected to the input, output and the intermediate outputs of said second delay line and effective to provide a second integrated analog output signal approximating the amplitude-time integral of said first integrated analog output signals in a second predetermined time interval, a first and a second clipping circuit connected to the output of said second summing network and amplifier and effective to provide output signals when said second integrated output signals exceed first and second limits, respectively; an output circuit, first logic circuit means connected to said first clipping circuit and said output circuit and effective at predetermined times to supply an output signal from said first clipping circuit to said output circuit when said first clipping circuit supplies an output therefrom, second logic circuit means connected to said second clipping circuit and said output circuit and effective to provide an output signal from said second clipping circuit to said output circuit when said second clipping circuit supplies an output therefrom, and memory means connected to said output circuit and effective to render said second logic means effective only when a signal has been supplied to said output circuit during the next preceding sampling interval.

5. Data reduction apparatus for reducing data supplied thereto from pattern scanning apparatus which provides scanning signals occurring at predetermined sampling intervals during each of successive scans, comprising first integrating means connected to said scanning apparatus for integrating said scanning signals over a series of overlapping first intervals equal to a first predetermined number of said sampling intervals, second integrating means connected to said first means for integrating the output of said first integrating means over a second interval less than the number of intervals in a single scan, third integrating means connected to said second integrating means for integrating the output of said second integrating means at a series of points, the interval between adjacent points being equal to the time of a single scan, and fourth integrating means connected to said third integrating means for integrating the output of said third integrating means over another series of points, the interval between adjacent points being equal to the time of a single scan.

References Cited by the Examiner

UNITED STATES PATENTS

| | | | |
|---|---|---|---|
| 2,750,110 | 6/56 | Och | 235—183 |
| 2,787,418 | 4/57 | MacKnight et al. | 235—154 |
| 2,836,356 | 5/58 | Forrest et al. | 235—154 |
| 2,864,556 | 12/58 | Raymond | 235—183 |
| 2,911,151 | 11/59 | Dorand | 235—183 |
| 2,942,782 | 6/60 | Blizard | 235—182 |
| 2,967,018 | 1/61 | Fogarty | 235—183 |
| 2,974,868 | 3/61 | Eyestone | 235—183 |

MALCOLM A. MORRISON, *Primary Examiner.*

LEO SMILOW, WALTER W. BURNS, JR., *Examiners.*